United States Patent Office 3,194,755
Patented July 13, 1965

3,194,755
DEHALIDED PLATINUM ON ALUMINA CATALYST AND REFORMING PROCESS THEREWITH
Edward B. Cornelius, Swarthmore, and Lee A. Cosgrove, West Chester, Pa., assignors to Air Products and Chemicals, Inc., Philadelphia, Pa., a corporation of Delaware
No Drawing. Filed Mar. 20, 1962, Ser. No. 181,155
The portion of the term of the patent subsequent to Nov. 4, 1980, has been disclaimed and dedicated to the Public
2 Claims. (Cl. 208—139)

This invention relates to the hydrogenative reforming of naphtha to prepare high octane gasoline by the use of a catalyst characterized by about 0.3–0.9% platinum on eta alumina, said catalyst containing less halide than 25% by weight of the platinum and to a method of preparing such catalyst. This application sets forth some subject matter related to that in an application of Lee A. Cosgrove, Serial No. 20,037, filed April 5, 1960, and entitled "Catalytic Hydrocarbon Conversion and Method of Preparing Catalyst for Same," now U.S. Patent No. 3,109,823.

The superiority of platinum as a catalyst in a reaction involving hydrogenation and/or dehydrogenation and/or hydrogenolysis of organic compounds has been recognized for many years. The superiority of alumina as a carrier for a catalytic component for vapor phase organic reactions has long been recognized. High purity platinum for use in the manufacture of catalyst has generally been supplied to catalyst manufacturers as chloroplatinic acid. When sorptive alumina is impregnated with chloroplatinic acid, and the impregnated material is treated in a dry hydrogen stream at an elevated temperature, the resulting catalyst consists of alumina, metallic platinum, and an amount of chloride combined with the alumina corresponding to about 110% by weight of the platinum. Sorptive alumina catalyst particles containing about 0.5% platinum and about 0.55% chloride have been available commercially because such particles can be made from available materials by the impregnation technique.

Many procedures have been suggested in the technical literature for the substantial dehaliding of a chloroplatined alumina. Some previous workers have sought to provide catalysts with gamma alumina base of minimized acidity, but the present invention is concerned with the preparation of platinum on eta alumina catalyst particles having an acid function of very high stability attributable to the eta alumina characteristics and minimized chloride content. In the development of the present invention, it was established that the dehalided platinum on eta alumina catalyst had important advantages in reforming operations at high severity. Some halide containing catalysts which perform satisfactorily at the moderate conditions acceptable many years ago, tend to promote excessive coke deposition during initial operation at high severity, and to be very sensitive to fluctuations in the concentration of moisture (e.g., about 80 p.p.m.) in the feed, but the dehalided catalyst of the present invention has attractively uniform acid activity throughout a wide range of reforming operations.

In accordance with the present invention, a naphtha is up-graded in the presence of several moles of hydrogen under a pressure within the range from about 20 to about 40 atmospheres at a temperature within the range from about 470 to 540° C., at a liquid hourly space rate within the range from about 0.5 to 15 volumes of hydrocarbon per volume of catalyst per hour in the presence of pellets of a platinum on alumina catalyst characterized by the presence of a concentration of halide less than 25% by weight of the platinum, said platinum being distributed on a sorptive eta alumina derived from beta alumina trihydrate. Such platinum on eta alumina catalyst pellets are prepared by the dehaliding of chloroplatined alumina particles by successive treatments with gaseous hydrogen sulfide, gaseous oxygen, gaseous ammonia, and several successive washings with deionized water to remove the chloride as ammonium chloride prior to the calcining of the platinum-containing particles. The treatments with the gaseous reactants are at moderate temperatures within the range from 15 to 70° C. Said catalyst preparation differs from the method of the parent case in that the particles are treated with oxygen prior to treatment with ammonia.

The nature of the invention is further clarified by reference to sets of data designated as examples.

Example 1

Sorptive eta alumina is prepared by dehydration of bayerite, i.e., beta alumina trihydrate. Chemical analysis of the bayerite indicates that the level of the impurities such as silica, sodium oxide, and/or other impurities which might be retained in a sorptive alumina is significantly less than 1% by weight of the sorptive alumina. The bayerite is mixed with nitric acid and water to prepare a powder suitable for extrusion as pellets. The mixture of water, nitric acid, and bayerite flows as a powder to an extruding machine in which the nitrate component of the mixture helps to function as a plasticizer during the transformation of the powder into extruded cylinders which are sliced into pellets having a length approximately equal to diameter. The extruded pellets are dehydrated at a temperature which is increased gradually so that the pellets are maintained at about 450° C. during the final stages of the dehydration. The pellets are cooled to room temperature.

These high purity eta alumina pellets are then given the series of treatments concerned with the chloroplatinate impregnation operation. The sorptive eta alumina particles are subjected to a humidification step at substantially room temperature, i.e., within a temperature range from about 15° C. to about 70° C. whereby water vapor is sorbed into the apparently dry particles so that the total matter volatilized at 700° C. is increased from the 1–6% range to the 9–18% range. The humidified particles are transferred to a pressure vessel in which the atmosphere surrounding the particles may be controlled. The pressure within the vessel containing the humidified eta alumina particles is reduced to about 150 millimeters of mercury absolute, thereby removing much of the air from in and around the particles. The vessel is then charged with carbon dioxide at an absolute pressure within the range from about 1.1 to 5 atmospheres. The carbon dioxide pressure is retained for several minutes and then the cycle of evacuation and repressurizing with carbon dioxide is repeated. After the eta alumina particles have been treated a suitable number (e.g., 2) of cycles with carbon dioxide, they are sprayed with a solution of chloroplatinic acid to impregnate a quantity of platinum corresponding to from 0.3 to 0.9% by weight platinum in the dehydrated catalyst. By reason of the combination of the step of humidification and the step of carbonation, the chloroplatinate solution distributes itself throughout the internal pores of the eta alumina particles. Thus the impregnation procedure differs greatly from previous methods in which the concentrated chloroplatinic alumina solution was sorbed into only the peripheral portions of each alumina particle.

Particular attention is directed to the step of dehaliding the particles with impregnated chloroplatinic acid. The particles comprising eta alumina and chloroplatinic acid are treated at a moderate temperature within the range from 15° to 70° C. in a pressure vessel with a series of gases, thus transforming the chloride content of the composite to ammonium chloride in such a form that it may be readily leached from the particles, and thus transforming the platinum so that it is securely bonded to the alumina, possibly through bonds involving sulfur and/or oxygen, whereby the platinum component resists removal by subsequent leaching treatment with water.

The gas with which the particles are first treated is hydrogen sulfide. The chloroplatinated alumina pellets are treated by a cycle consisting of an evacuation and then pressurizing with hydrogen sulfide, and the treatment is repeated one or more times.

Of importance is the step of treating the sulfided particles with an oxygen-containing gas prior to treatment with ammonia. In the absence of the oxidation step, the amount of platinum removed during the subsequent leaching of the particles with water is significantly greater than when the oxidation step is employed. The reason for the effectiveness of the oxidation step is not fully understood, but there appears to be a possibility that some of the platinum sulfide particles of colloidal size and/or molecular size are oxidized in such a manner that they are bonded chemically to the alumina through sulfite and/or other oxygen containing linkages. The treatment of the sulfide particles with oxygen can be at atmospheric pressure or it may involve several stages of evacuation and pressurizing.

After the sulfided particles have been treated with oxygen-containing gas such as air, they should be evacuated and treated with ammonium to bring about the formation of ammonium chloride on the internal surface of the particles. The pellets are subjected to the gaseous ammonia at a moderate temperature, that is, at a temperature within the range from about 15° C. to about 70° C. The pressurizing with ammonia generally requires approximately one hour and within the range from about 30 to 120 minutes.

After the particles have been treated with ammonia, they may be leached with water to remove substantially all of the chloride content while removing no significant fraction of the platinum content of the particles. This leaching operation can be conducted by immersing the pellets in demineralized water, and leaching the chloride content for a period from about 10 to 120 minutes, and thereafter immersing the pellets in another batch of demineralized water. In an alternative embodiment of the invention, the leaching operation is conducted on a continuous counter-current basis. As a result of leaching, the total chloride content of the pellets is reduced to less than 25% by weight of the platinum content of the particles. The chloride removal step is conducted on the particles prior to heating the particles to elevated temperatures, whereby the strength of the bonds between the alumina and the chloride are not permitted to strengthen prior to the halide removal step. The affinity of sorptive alumina for small amounts of chloride is extremely great. Notwithstanding the propensity of sorptive alumina to combine tenaciously with trace amounts of chloride, the dehaliding method of the present invention removes most of the chloride from the alumina by leaching with water at moderate temperatures within the range from about 15° to about 70° C.

The leached pellets are heat treated to remove the volatile matter such as water, and this treatment may include several stages, such as one hour at 100° C., two hours within the 100 to 500° C. range, and three hours at 500° C. The heat treated platinum on eta alumina catalyst particles are allowed to cool to room temperature and are packaged for shipment to a petroleum refinery in containers protecting the particles from atmospheric humidity.

After the catalyst particles are loaded into a catalytic reforming unit, they are heated carefully to withdraw any moisture which might be sorbed from the circulating inert gas and after the inert gas stream circulating through the catalyst bed is sufficiently dried to contain less than about 50 parts per million of moisture and the temperature of the circulating gas is above about 250° C., the catalyst is reduced from platinum sulfide to metallic platinum by treatment with hydrogen at a temperature above 250° C. The reforming unit is filled with high purity hydrogen as the catalyst bed is heated from about 250° C. to 470° C., at which temperature hydrocarbon gas may be introduced for reforming treatment. The naphtha hydrocarbons are reformed over the platinum on eta alumina catalyst at a temperature within the range from about 470 to 550° C. at a pressure of from about 20 to about 40 atmospheres at a hydrogen to liquid hydrocarbon mol unit ratio within the range from 5:1 to 25:1 at a liquid space velocity of about 0.5 to about 20 volumes of liquid hydrocarbon per volume of catalyst per hour to produce a reformate having an octane number significantly higher than that of the naphtha feed stock. The platinum on eta alumina catalyst substantially free from halide, is especially effective at severe reforming conditions in that the catalyst possesses remarkable stability, whereby it is possible to obtain greater number of barrels of high octane number reformate than from some competitive catalysts containing halide. The halide free catalyst of the present invention is remarkable in that the carbonaceous deposit resulting from the prolonged use of the catalyst at severe reforming conditions may be removed by a regeneration procedure which does not seriously impair the activity of the dehalided catalyst. Moreover, the catalyst retains the high surface area throughout a number of cycles of severe reforming and regeneration so that the eta alumina characteristics are conspicuous even when the catalyst is sufficiently deactivated to warrant the replacement of the catalyst.

Obviously many modifications and variations of the invention as hereinbefore set forth may be made without departing from the spirit and scope thereof, and therefore only such limitations should be imposed as are indicated in the appended claims.

What is claimed is:

1. A method for preparing catalyst particles having the advantageous combination of from 0.1 to 2% by weight of platinum on a sorptive alumina carrier, in which method there are steps including the preparing hydrated alumina granules substantially free from chloride, subjecting such granules to high temperature dehydration to prepare sorptive alumina particles substantially free from chloride, cooling the sorptive alumina particles, impregnating aqueous solution containing chloroplatinate ion into the sorptive alumina particles to provide chloroplatinated alumina particles having a platinum content within the range from 0.1 to 2% by weight, said impregnating being conducted at a temperature within the range from 60° F. to 140° F., subjecting the chloroplatinated alumina particles to gaseous hydrogen sulfide at a temperature within the range from about 60° F. to about 140° F., subjecting the sulfided particles to gaseous ammonia at a temperature within the range from about 60° F. to about 140° F., washing the ammonia-treated particles with deionized water to remove substantially all of the chloride derived from the chloroplatinate, whereby the chloride content of the particles is reduced to less than 25% of the platinum content, said washing being conducted at a temperature within the range from about 60° F. to about 140° F., drying the particles subsequent to said impregnating, sulfiding, ammoniating, and washing of the particles and withdrawing as the product of the process dry sorptive alumina particles having a chloride content less than 25% by weight of the platinum content, said particles containing platinum constituting from 0.1 to 2% by weight of the particles, the improvement which consists of: imparting superior bonding of the platinum to the alumina by treating the chloroplatinated particles with gaseous hydrogen sulfide, withdrawing the hydrogen sulfide gas to provide evacuated sulfided particles, directing a stream of oxygen-containing gas over the sulfided particles at a temperature within the range from about 15° C. to 70° C. for a time adapted to modify the bonding between the alumina and platinum sulfide, withdrawing the oxygen-containing gas to provide evacuated oxidized particles, treating the thus oxidized particles with gaseous ammonia, and washing chloride from the ammoniated particles to prepare alumina particles containing a quantity of platinum corresponding to the amount of platinum impregnated from the chloroplatinic acid.

2. The method of upgrading naphtha which includes the step of treating a gas stream consisting essentially of naphtha and several mols of hydrogen per mol of naphtha at a pressure within the range from about 20 to 40 atmospheres at a temperature within the range from about 470 to 540° C. at a liquid hourly space rate within the range from about 0.5 to 15 volumes of hydrocarbon per volume of catalyst per hour in the presence of catalyst granules prepared by the method of claim 1.

References Cited by the Examiner
UNITED STATES PATENTS

| | | | |
|---|---|---|---|
| 2,479,110 | 8/49 | Haensel | 208—139 |
| 2,851,398 | 9/58 | Gornowski et al. | 208—139 |
| 2,891,965 | 6/59 | Voltz et al. | 252—466 |
| 2,908,654 | 10/59 | Heinemann et al. | 252—466 |
| 2,968,635 | 1/61 | Nixon | 252—466 |
| 3,109,823 | 11/63 | Cosgrove | 252—442 |

ALPHONSO D. SULLIVAN, *Primary Examiner.*